(No Model.)

E. OVER.
SPRING WASHER.

No. 253,886. Patented Feb. 21, 1882.

WITNESSES.
James B. Ligius.
R. P. Daggett.

INVENTOR.
Ewald Over,
PER
C. Bradford
ATTORNEY.

UNITED STATES PATENT OFFICE.

EWALD OVER, OF INDIANAPOLIS, INDIANA.

SPRING-WASHER.

SPECIFICATION forming part of Letters Patent No. 253,886, dated February 21, 1882.

Application filed January 3, 1882. (No model.)

*To all whom it may concern:*

Be it known that I, EWALD OVER, of the city of Indianapolis, county of Marion, and State of Indiana, have invented certain new and useful Improvements in Spring-Washers, of which the following is a specification.

The object of my said invention is to produce a spring-washer which shall have a substantially equal spring force upon all sides of the nut under which it is placed, which object is accomplished by so constructing the washer that some portion of its surface upon its several sides shall bear against said nut and other portions shall bear against the surface between which and the nut the washer is placed.

I am aware that a washer has been made in the form of a section of a helical spring; but this does not serve the purpose of my invention, as the spring force of such a washer cannot be made to bear with equal force against all sides of the nut, but must necessarily exert all its force upon one side, thus giving a twisting force against said nut. It has a further disadvantage in that it is cut entirely through from center to circumference on one side, and is therefore liable to be twisted apart or broken, which my washer, being whole in this particular, cannot well be. I therefore disclaim such a washer, as it forms no part of my invention.

Figure 1:
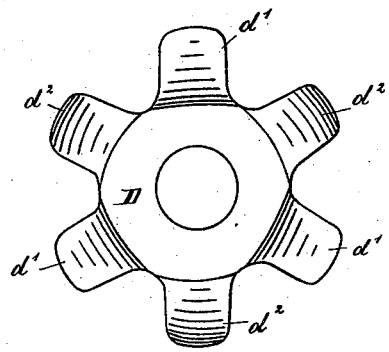
Figure 2:
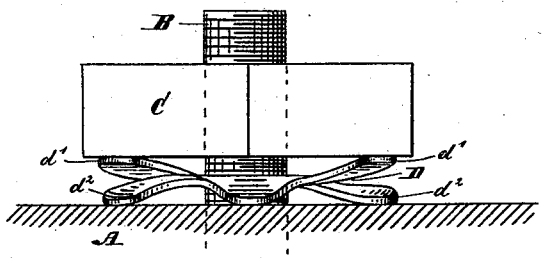

Referring to the accompanying drawings, which are made a part hereof, and on which similar letters of reference indicate similar parts, Figure 1 is a top or plan view of a washer embodying my said invention, and Fig. 2 is a side elevation thereof as seen when in use on a bolt before said bolt is screwed down.

In said drawings, the portion marked A represents the timber or other portion through which the bolt passes; B, the bolt; C, the nut thereon, and D the washer, which in the form shown is provided with wings $d'$ $d^2$, which are respectively elevated above and depressed below the general level of the body of the washer.

As will be readily seen, this formation gives the greatest amount of spring force to the washer, and at the same time distributes said force equally around the nut, thus permitting the pressure of the latter to be as even as when the ordinary flat washer is used, and the disadvantages of unduly weakening the washer by splitting and of having it exert a twisting force upon the nut and bolt are wholly avoided.

There may be several changes in the form of this washer without departing from my invention. All the wings may, for instance, be turned in one direction, and they all bear against either the article through which the bolt passes or against the nut, while the center of the washer will bear against the other. Coarse corrugations in the washer would also answer the purpose.

Having thus fully described my said invention, what I claim as new, and desire to secure by Letters Patent, is—

1. A washer for bolts, &c., in which several wings or their described equivalents are bent away from the plane of the body of the washer, upon all sides of the same, whereby a substantially equal spring force is caused to be exerted against all portions of the nut simultaneously, substantially as set forth.

2. The combination, with a bolt and its nut, of the spring-washer D, having the wings $d'$ $d^2$ bent alternately in each direction away from the plane of the body of the washer, substantially as set forth.

In witness whereof I have hereunto set my hand and seal, at Indianapolis, Indiana, this 31st day of December, A. D. 1881.

EWALD OVER. [L. S.]

In presence of—
D. H. SHAMBERGER,
C. BRADFORD.